United States Patent [19]

Terashima

[11] Patent Number: 4,469,430
[45] Date of Patent: Sep. 4, 1984

[54] LIGHT BEAM PRINTER
[75] Inventor: Isamu Terashima, Hitachi, Japan
[73] Assignee: Hitachi, Ltd., Tokyo, Japan
[21] Appl. No.: 445,585
[22] Filed: Nov. 30, 1982
[30] Foreign Application Priority Data Nov. 30, 1981 [JP] Japan .................................. 56-190876
Dec. 15, 1981 [JP] Japan .................................. 56-200853

[51] Int. Cl.³ .......................................... G03G 15/00
[52] U.S. Cl. ...................................... 355/3 R; 355/1
[58] Field of Search ................. 355/39, 40, 14 R, 55, 355/3 CH, 3 R; 358/302, 208, 300

[56] References Cited
U.S. PATENT DOCUMENTS 3,872,462  3/1975  Lemelson ........................... 355/3 R
4,122,462  10/1978  Hirayama et al. .............. 355/3 R X
4,169,275  9/1979  Gunning ............................. 358/300
4,277,160  7/1981  Yamada .............................. 355/3 R
4,351,005  9/1982  Imai et al. ...................... 355/3 R X

FOREIGN PATENT DOCUMENTS 48-98844  12/1973  Japan .

Primary Examiner—A. C. Prescott
Attorney, Agent, or Firm—Antonelli, Terry & Wands

[57] ABSTRACT

In a laser beam printer for scanning a surface of a uniformly charged photoconductive photosensitive drum by a laser beam to form an electrostatic latent image and developing the electrostatic latent image by fine particles of toner, a dust-proof box is provided at a laser beam emitting port of an exposure optical system to prevent the toner from entering into the exposure optical system and contaminating the same.

8 Claims, 10 Drawing Figures

LIGHT BEAM PRINTER

The present invention relates to a light beam printer, and more particularly to a light beam printer which utilizes an electrophotographic technique and exposes a photoconductive photosensitive material by scanning to a laser beam spot to form an electrostatic latent image and develop the electrostatic latent image by toner to produce a visual image.

A laser beam printer which is one of the light beam printers has a deflection mirror which is rotated or swung around a support axis, an F-O lens and a deflection mirror facet error correction optical system for scanning a surface of a uniformly charged photoconductive photosensitive drum by a laser beam. As disclosed in Japanese Laid-Open Patent Application No. 48-98844, the facet error correction optical system compensates for the reduction of resolution power of a recorded image due to a low accuracy of deflection scan by the deflection mirror. In an exposure system for light-scanning the surface of the photoconductive photosensitive drum by the laser beam reflected by the deflection mirror through the F-O lens, the facet error correction optical system is disposed between the F-O lens and the photoconductive photosensitive drum. In many cases, a cylindrical lens is used in the facet error correction optical system. Especially, the cylindrical lens of a shorter focal distance, which has a higher compensation effect, is arranged closely to the surface of the photoconductive photosensitive drum. On the other hand, an electrostatic latent image is formed by the light scan of the exposure system on the surface of the photoconductive photosensitive drum which is one of the elements of the electrographic recording mechanism, and the electrostatic latent image is developed by fine particle toner. A dry developer for the electrostatic latent image includes one-component developer and two-component developer, and a developing method includes a cascade process and a magnetic brush process. In any events, scattering of the fine particle toner of the developer into the air is unavoidable. As a result, the fine particle toner deposits on the cylindrical lens arranged closely to the surface of the photoconductive photosensitive drum and the lens is contaminated to reduce a transmission efficiency of the laser beam. When a semiconductor laser beam generator (laser diode) is used, the attenuation of the laser beam by the contamination of the cylindrical lens results in underexposure on the surface of the photoconductive photosensitive drum and degradation in quality of the recorded image because the laser diode cannot produce a high laser beam output. In order to resolve the above problem, the cylindrical lens must be frequently cleaned. However, during the cleaning, the cylindrical lens may be scratched or the position of the lens may be misaligned if the cylindrical lens is removably mounted to facilitate the cleaning. Moreover, each cleaning would be against the demand of maintenance-free feature. The above is equally applicable to the F-O lens in the exposure optical system which has no facet error correction optical system.

It is, therefore, an object of the present invention to provide a light beam printer which prevents the facet error correction optical system or the F-O lens in the exposure optical system from being contaminated by fine particles of toner so that a high quality of image is obtained over a long time period.

In order to achieve the above object, in accordance with the present invention, a dust-proof box including a wall having a slit for forming a path for a light beam and a dust sink space formed inside of the wall is arranged at a light beam emitting port of the exposure optical system so that a flow rate of air passed through the slit is reduced in the dust sink space to remove the fine particles of toner floating in the air and prevent the fine particles of toner from depositing on the facet error correction optical system or the F-O lens of the expsoure optical system.

The present invention will be apparent from the following detailed description taken in conjunction with the accompanying drawings, in which:

FIGS. 1 to 8 show one embodiment of the present invention, in which

FIG. 1 shows a cross-sectional plan view of a laser printer,

FIG. 2 shows a longitudinal sectional side view thereof,

Figure 1:
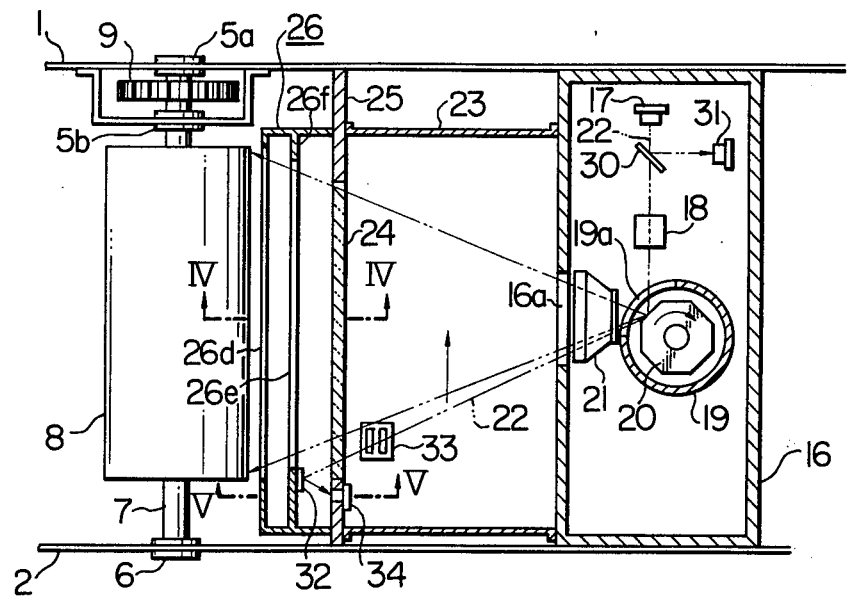
Figure 3:
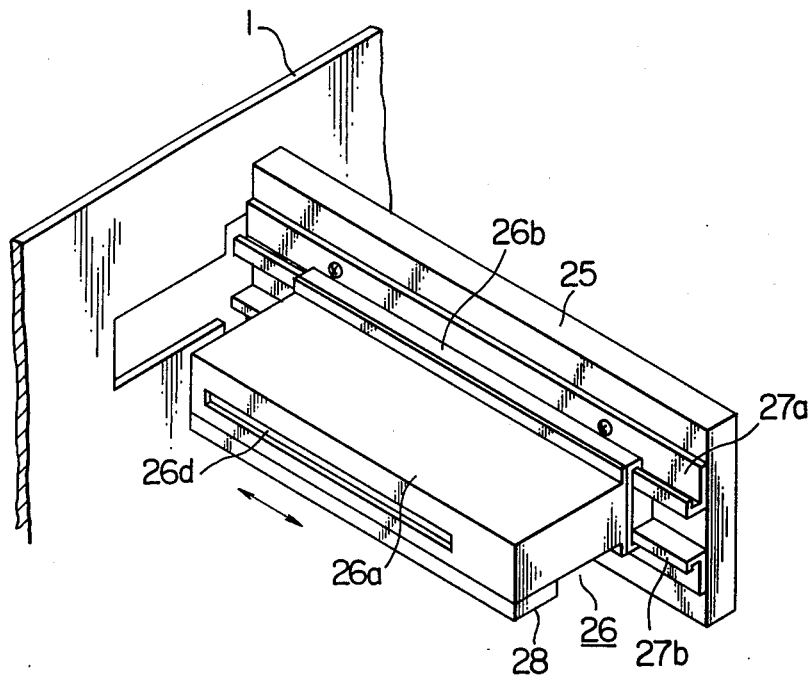
Figure 4:
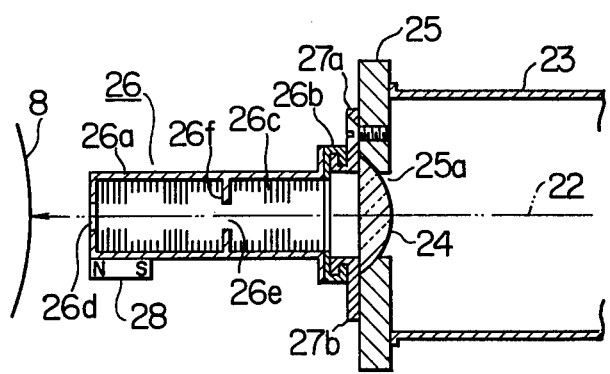
Figure 5:
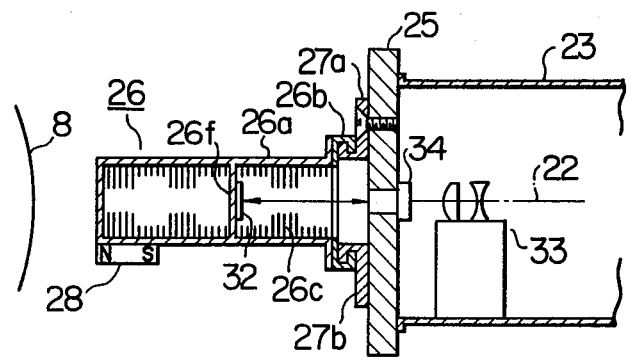
Figure 6:
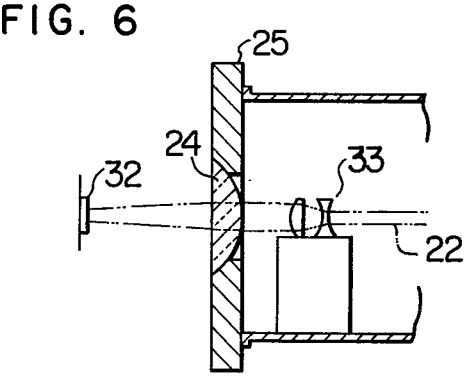
Figure 7:
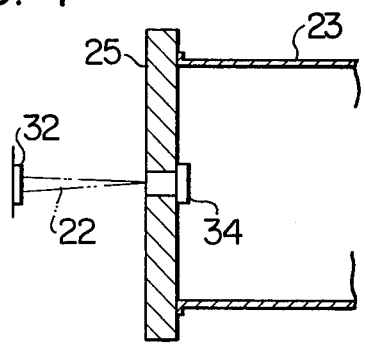
Figure 8:
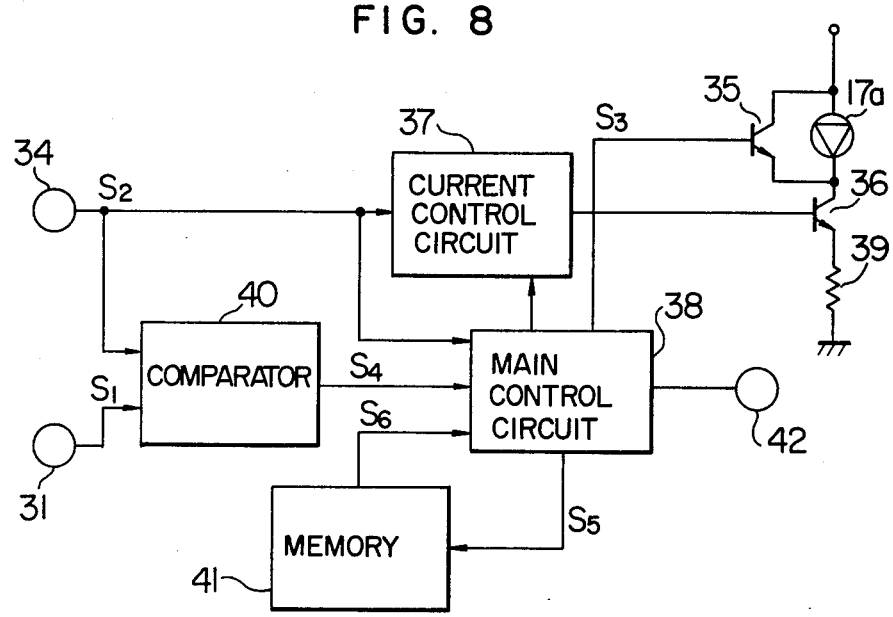
Figure 9:
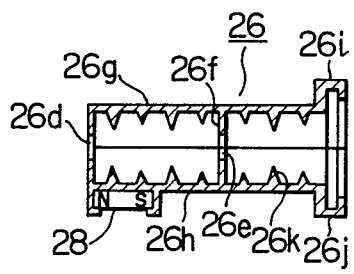
Figure 10:
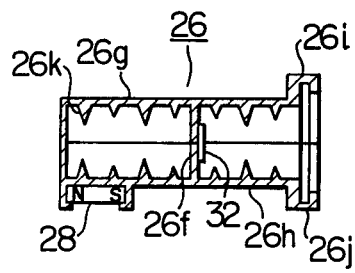

FIG. 3 shows a perspective view of a facet error correction optical system and a dust-proof box, FIG. 4 shows a sectional view taken along a line IV—IV in FIG. 1, FIG. 5 shows a sectional view taken along a line V—V in FIG. 5, FIG. 6 shows a sectional view illustrating an incident light path to a small size mirror, FIG. 7 shows a sectional view illustrating a reflected light path from the small size mirror, FIG. 8 shows a laser light source control circuit, and FIGS. 9 and 10 show a modification of the dust-proof box, in which FIG. 9 shows a longitudinal sectional side view of a laser beam transmitting section, and FIG. 10 shows a longitudinal sectional side view of a laser beam reflection section.

Figure 2:
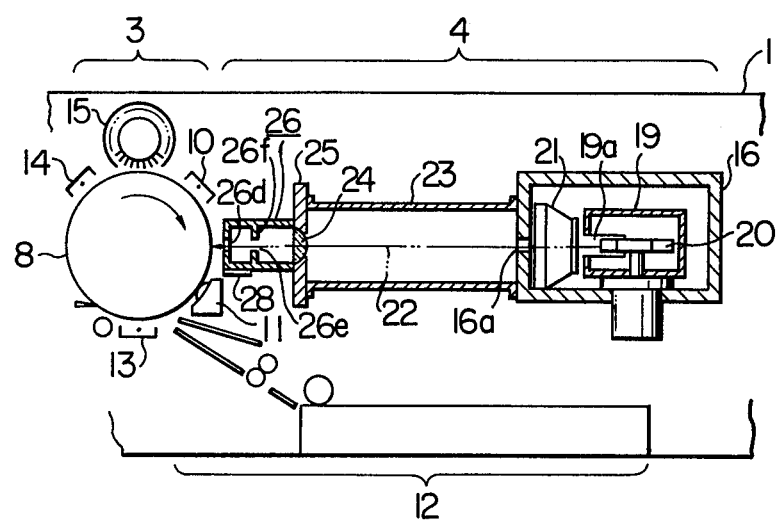

One embodiment of the present invention is now explained in detail. FIG. 1 shows a cross-sectional plan view of a laser beam printer and FIG. 2 shows a longitudinal sectional side view thereof. Side plates 1 and 2 serve as support frames for an electrostatic recording mechanism 3 and an exposure optical system 4. The electrostatic recording mechanism 3 has a photoconductive photosensitive drum 8 mounted on a shaft 7 which is supported to the side plates 1 and 2 by bearings 5a, 5b and 6. The photoconductive photosensitive drum 8 is rotated in a direction of an arrow by a drive source, not shown, through a gear 9. A surface of the photoconductive photosensitive drum 8 is uniformly charged by a charger 10 and it is scanned by a laser beam by the exposure optical system 4 so that an electrostatic latent image is formed thereon. A developing unit 11 rubs the photoconductive photosensitive drum 8 by a magnetic brush which attracts one-component developer or two-component toner consisting of mixture of magnetic carrier and fine particle toner, as the magnetic fine particle toner, to develop the electrostatic latent image to form a toner image. A paper feed unit 12 contains record paper sheets therein and feeds out the record sheets, one at a time, to bring them into contact with the photoconductive photosensitive drum 8 so that the toner image on the surface of the photoconductive photosensitive drum 8 is transferred to the record sheet by an electrostatic transfer unit 13. A discharger 14 removes charges remaining on the surface of the photoconductive photosensitive drum 8 after the transfer, and a cleaner 15 removes the toner remaining on the surface of the photoconductive photosensitive drum 8. The exposure optical system 4 comprises a laser light source 17 arranged in an optical box 16, a coupling lens 18, a scanner housing 19, a constantly rotated polygon mirror 20 and an F-O lens 21. The laser light source 17 is controlled by image information to be recorded so that an intensity of a laser beam 22 generated is modulated. The laser beam 22 is collimated by the coupling lens 18 and projected to the polygon mirror 19 through a window 19a of the scanner housing 19, and a reflected beam therefrom passes through the F-O lens 21 and directed to the surface of the photoconductive photosensitive drum 8 through a window 16a of the optical box 16. A light path outside of the window 16a of the optical box 16 is dust-protected by a guide case 23 having a rectangular cross-section and a laser beam emitting port at an end of the guide case 23 is closed by a lens holder 25 having a facet error correction cylindrical lens 24. A dust-proof box 26 is arranged outside of the lens holder 25 to prevent the floating fine particle toner from depositing on the cylindrical lens 24.

The facet error correction optical system and the dust-proof box 26 are now explained in detail with reference to FIG. 3 showing its perspective view and FIG. 4 showing its longitudinal sectional side view.

The lens holder 25 comprises a grounded conductive member and is fixed between the side plates 1 and 2. The lens holder 25 has a window 25a in which the cylindrical lens 24 is fitted and supported by conductive clamp members 27a and 27b for compensating a swing or facet error of the beam perpendicular to the scan direction, which facet error may be created when the laser beam is deflected for scanning. The dust-proof box 26 has a conductive body 26a, an engaging member 26b and conductive needle electrodes 26c studded on an inner wall of the body 26a. The engaging member 26b is slidably and removably attached to an engaging section formed by the clamp members 27a and 27b. Slits 26d and 26e through which the laser beam 22 passes are formed in a wall of the body 26a facing the photoconductive photosensitive drum 8 and in an intermediate wall 26f. The slits 26d and 26e each has a length corresponding to a deflection scan distance of the laser beam 22 on the photoconductive photosensitive drum 8, and a width, as measured perpendicular to the deflection scan direction, close to the laser spot diameter. The slit width may be desirably 0.5-2 mm in view of machining precision. The needle electrodes 26c comprise long fiber groups and short fiber groups of electrostatically studded conductive fibers (or those conduction-treated after studding) which are arranged not to interrupt the laser beam light path. A permanent magnet 28 extends over an entire width of the body 26a on the outer surface of the bottom wall of the body 26a in the vicinity of the slit 26d.

In the laser beam printer thus constructed, the image information is recorded in the following manner. The photoconductive photosensitive drum 8 is kept rotated in the direction of the arrow at the constant speed, the surface thereof is uniformly charged by the charger 10 and then it is exposed by the laser beam 22 and the charge is discharged. The laser beam 22 emitted from the laser light source 17 is projected to the polygon mirror 20 through the coupling lens 18, and the reflected beam 22 from the polygon mirror 20 reaches the surface of the photoconductive photosensitive drum 8 through the F-O lens 21, the window 16a, the cylindrical lens 24 and the slits 26d and 26e of the dust-proof box 26. Since the polygon mirror 20 rotates at the constant speed, the reflection angle of the laser beam 22 changes in proportion to the rotation angle and the laser beam spot on the surface of the photoconductive photosensitive drum 8 moves toward the axial center. The generation of the laser beam 22 is controlled by the image information to display the charges in the areas to which the toner is to be deposited. For each scan of the laser beam spot, the surface of the photoconductive photosensitive drum 8 is moved by one scan line width so that the electrostatic latent image is formed on the surface of the photoconductive photosensitive drum 8. The electrostatic latent image is developed by the developing unit 11 to form the toner image which is then transferred to the record sheet by the electrostatic transfer unit 13.

As described above, since the developing unit 11 is disposed in the vicinity of the exposure optical system 4, the fine particles of toner float in the air. In the present embodiment, in order for the floating fine particles of toner to deposit on the surface of the cylindrical lens 24, it would have to pass through the slit 26d of the dust-proof box 26, the needle electrodes 26c and the slit 26e sequentially. However, since the sectional area of the path of the body 26a is larger than the slits 26d and 26e, the air flow rate in the box is greatly lowered and the floating fine particles of toner sink by their own gravity. An electostatic deposition force acts on the charged fine particles of toner to deposit them to the structure of the box and the needle electrodes 26c increase the potential gradient by an edge effect to accelerate the electrostatic deposition effect of the fine particles of toner. Since the dust-proof box 26 is conductive and grounded through the lens holder 25, the elecrostatically deposited fine particles of toner discharge their charges and lose the deposition force and drop to the bottom surface. When the magnetic carriers or the magnetic fine particles of toner enter into the dust-proof box 26, they are removed not only by the gravity and the electrostatic deposition but also the magnetic force of attraction by the magnet 28. Accordingly, the amount of the fine particles of toner or other dust which pass through the slit 26e and reach the surface of the cylindrical lens 24 is very small and the contamination of the cylindrical lens 24 is prevented. When a large amount of fine particles of toner or dust are piled up in the dust-proof box 26, the dust-proof box 26 is removed for cleaning or exchange.

Since the cylindrical lens 24 is mounted at the laser beam emitting port of the guide case 23 in the exposure optical system 4, the optical box 16 can be substantially hermetically sealed from the atmosphere so that the coupling lens 18, the polygon mirror 20 and the F-O lens 21 are dust-protected to an extent that they need not be cleaned.

In the above embodiment, the needle electrodes 26c in the dust-proof box 26 comprise long fiber groups and short fiber groups of electrostatically studded fibers. Alternatively, they may be conductive fibers of various length electrostatically studded at random with the longest fiber not interrupting the laser beam light path. Alternatively, insulative fibers may be electrostatically studded and anti-electrostatic agent may be sprayed thereon to make them conductive.

In order to measure the intensity of the laser beam 22 emitted from the laser light source 17, a half-mirror 30 is provided between the laser light source 17 and the coupling mirror 18 as shown in FIG. 1, so that a portion of the laser beam 22 emitted from the laser light source 17 is branched to a first light detector 31 which has a photo-electric conversion element to produce a first electrical signal $S_1$ having a magnitude proportional to the incident laser beam intensity.

In order to detect the deflection scan position of the laser beam 22 and the contamination of the cylindrical lens 24, a small mirror 32 is disposed on the intermediate wall 26f of the dust-proof box 26 as shown in FIGS. 1 and 5. The laser beam 22 is projected through a beam expansion optical system 33 and the cylindrical lens 24 to the small mirror 32, by which it is reflected toward a second light detector 34. As shown in FIG. 6, the diameter of the laser beam 22 is expanded in a direction perpendicular to the scan direction by the beam expansion optical system 33 and reconverged by the cylindrical lens 24, thence the laser beam 22 reaches the small mirror 24. As the beam diameter of the laser beam 22 is expanded, the laser beam 22 is attenuated in proportion to the degree in average of contamination of the cylindrical lens 24. As shown in FIG. 7, the laser beam 22 reached to the small mirror 32 is reflected and directed to the second light detector 34. The second light detector has a photo-electric conversion element to produce a second electrical signal $S_2$ of a magnitude proportional to the intensity of the incident laser beam 22. Thus, the generation of the second electrical signal $S_2$ indicates that the laser beam 22 was deflected to the position of the second light detector 34 and the magnitude of the second electrical signal $S_2$ indicates the intensity of the laser beam 22 transmitted through the cylindrical lens 24.

FIG. 8 shows an electric circuit for controlling the laser beam emitted from the laser light source 17. Numeral 35 denotes a switching transistor for turning on and off a current to drive a laser diode 17a in accordance with an image signal $S_3$, and numeral 36 denotes a laser output control transistor for controlling the current when the laser diode 17a is energized in accordance with the output signal $S_2$ of the second light detector 34. A current control circuit 37 for controlling the laser output control transistor 36 in accordance with the output signal $S_2$ of the second light detector 34 holds the second electrical signal $S_2$ pulsively inputted as the laser beam is deflection-scanned, for a predetermined time period and feedback-controls the on-current of the laser diode 17a by the laser output control transistor 36 in accordance with the magnitude of the signal $S_2$ such that the magnitude of the signal $S_2$ reaches a predetermined magnitude. An operation timing of the current control circuit 37 is controlled by a main control circuit 38. A protection resistor 39 prevents an excessive current from flowing into the laser diode 17a. A comparator 40 compares the first electrical signal $S_1$ with the second electrical signal $S_2$ and produces an output signal $S_4$ when a difference therebetween exceeds a predetermined level. The main control circuit 38 uses the second electrical signal $S_2$ as a deflection scan start reference timing, produces a clock signal $S_5$ in accordance with the position of the laser beam deflection scan, and reads out an image signal $S_6$ from an image signal memory 41. The image signal $S_6$ is amplified or timing-processed to produce the image signal $S_3$. The main control circuit 38 checks the presence or absence of the output signal $S_4$ generated by the comparator 40 during the presence of the second electrical signal $S_2$, and if it is present, turns on an indication lamp 42. By equally setting the magnitudes of the first and second electrical signals $S_1$ and $S_2$ which are produced when the cylindrical lens 24 is clean, a difference between the subsequent first and second electrical signals $S_1$ and $S_2$ is proportional to the contamination of the cylindrical lens 24. The comparator 40 uses the difference between the first and second electrical signals $S_1$ and $S_2$ produced when the contamination of the cylindrical lens 24 reaches a maximum allowable limit, as a reference difference, and produces the output signal $S_4$ when the difference between the input first and second electrical signals $S_1$ and $S_2$ exceeds the reference difference. Thus, when the contamination of the cylindrical lens 24 exceeds the maximum allowable limit, the indication lamp 42 is turned on to indicate the necessity of cleaning.

FIGS. 9 and 10 show an embodiment in which the dust-proof box 26 is molded by conductive resin material. FIG. 9 shows a sectional view of a laser beam transmission section and FIG. 10 shows a sectional view of a laser beam reflection section. In the present embodiment, upper and lower sections 26g and 26h of the box are molded separately and they are combined to form the box 26. Engaging members 26i and 26j for engaging clamp members 27a and 27b and neddle electrodes 26k and integrally molded.

A similar effect is attained in a modification in which the dust-proof box 26 is sectioned by a number of walls each having a slit corresponding to the laser beam light path and the electrostatic deposition effect like the needle electrodes is imparted to the walls and the air flow rate is attenuated in the spaces among the walls to sink the floating fine particles of toner and other dust.

The present invention is equally applicable to the light beam printer having no facet error correction optical system.

As described hereinabove, according to the present invention, by providing the dust-proof box including the wall having the slit forming the light path of the light beam and the dust sink space formed inside of the wall, at the light beam emitting port of the exposure optical system, the flow rate of the air flow in the dust sink space is lowered and the fine particles of toner or other dust floating in the air are removed. Accordingly, to the present invention, there is provided a light beam printer which prevents contamination of the exposure optical system and is capable of forming a high quality of image over an extended time period.

I claim:

1. A light beam printer comprising:
   an electrostatic recording unit for selectively discharging charges on a surface of a uniformly charged photoconductive photosensitive body to form an electrostatic latent image and developing the electrostatic image by fine particles of toner;
   an exposure optical system isolated from said electrostatic recording unit and having a light beam path for deflecting a light beam to scan the surface of said photoconductive photosensitive body by said light beam to selectively discharge said charges; and
   a dust-proof box disposed at a light beam emitting port of said exposure optical system and including a wall having a slit forming a light path for said light beam and a dust sink system formed inside of said wall.

2. A light beam printer according to claim 1 wherein said dust-proof box is made of conductive material.

3. A light beam printer according to claim 2 wherein needle electrodes are arranged on an inner wall of said dust-proof box.

4. A light beam printer according to claim 1 wherein a magnet is arranged in said dust-proof box.

5. A light beam printer according to claim 1 wherein said light beam emitting port has a deflection mirror facet error correction optical system and said dust-proof box is disposed at an end of said facet error correction optical system.

6. A light beam printer comprising:
an electrostatic recording unit for selectively discharging charges on a surface of a uniformly charged photoconductive photosensitive body to form an electrostatic latent image and developing the electrostatic image by fine particles of toner;
an exposure optical system insolated from said electrostatic recording unit and having a light beam path for deflecting a light beam to scan the surface of said photoconauctive photosensitive body by said light beam to selectively discharge said charges; and
a dust-proof box disposed at a light beam emitting port of said exposure optical system and including a plurality of walls each having a slit forming a light path for said light beam and dust sink spaces formed among said walls.

7. A light beam printer according to claim 6 wherein said dust-proof box is made of conductive material and needle electrodes are arranged on an inner wall of said dust-proof box.

8. A light beam printer comprising:
an electrostatic recording unit for selectively discharging charges on a surface of a uniformly charged photoconductive photosensitive body to form an electrostatic latent image and developing the electrostatic image by fine particle toner;
an exposure optical system isolated from said electrostatic recording unit and having a light beam path for deflecting a light beam to scan the surface of said photoconductive photosensitive body by said light beam to selectively discharge said charges;
a dust-proof box disposed at a light beam emitting port of said exposure optical system and including a wall having a slit forming a light path for said light beam and a dust sink space formed inside of said wall;
light detection means for detecting an intensity of the light beam emitted from said light beam emitting port to said dust sink space; and
means for comprising an intensity of the light beam emitted from said light source with the intensity of the light beam detected by said light detection means to monitor the contamination of said exposure optical system.

* * * * *